(12) United States Patent
Jost et al.

(10) Patent No.: US 11,603,019 B2
(45) Date of Patent: Mar. 14, 2023

(54) SEAT CRUSH STRUCTURE

(71) Applicant: Zoox, Inc., Foster City, CA (US)

(72) Inventors: Markus Jost, San Mateo, CA (US); Andrew Frank Raczkowski, San Jose, CA (US); Kern Rameshwar Sharma, San Mateo, CA (US); Daria Di Costanzo, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 313 days.

(21) Appl. No.: 16/443,679

(22) Filed: Jun. 17, 2019

(65) Prior Publication Data
US 2020/0391629 A1 Dec. 17, 2020

(51) Int. Cl.
*B60N 2/42* (2006.01)
*B60N 2/427* (2006.01)
*B60N 2/64* (2006.01)

(52) U.S. Cl.
CPC ....... *B60N 2/4228* (2013.01); *B60N 2/42709* (2013.01); *B60N 2/643* (2013.01)

(58) Field of Classification Search
CPC .. B60N 2/42709; B60N 2/4228; B60N 2/643; B60N 2205/35; B60N 2/68
See application file for complete search history.

(56) References Cited

U.S. PATENT DOCUMENTS

| | | | | |
|---|---|---|---|---|
| 5,127,120 A * | 7/1992 | Mason | ................. | B60N 2/2881 297/229 |
| 5,580,124 A * | 12/1996 | Dellanno | ............... | B60N 2/803 297/216.12 |
| 6,142,563 A * | 11/2000 | Townsend | ............ | B60N 2/4228 297/216.13 |
| 6,471,295 B1 * | 10/2002 | Messner | ............ | B60N 2/42709 297/216.12 |
| 7,331,631 B1 * | 2/2008 | Yeh | .................... | B61D 33/0035 5/636 |

(Continued)

FOREIGN PATENT DOCUMENTS

EP 2865564 A1 4/2015

OTHER PUBLICATIONS

PCT Search Report and Written Opinion dated Aug. 27, 2020 for PCT Application No. PCT/US2020/037711, 9 pages.

(Continued)

*Primary Examiner* — David R Dunn
*Assistant Examiner* — Christopher E Veraa
(74) *Attorney, Agent, or Firm* — Lee & Hayes, P.C.

(57) ABSTRACT

A seat of a vehicle is designed for safety to reduce risk of injury to an occupant of the seat in the event of an abrupt movement or a collision involving the vehicle from the rear. The seat may have seatback geometry designed to promote coupling an occupant to the seat, thereby minimizing a gap between an occupant and the seatback and, therefore, the impact forces to the occupant in a rear-facing collision by reducing a relative velocity between the occupant and the seat, as well as absorbing energy of the occupant over a longer distance. The seat may include one or more materials that plastically deform under a force imparted on the seat by the occupant accelerating relative to and toward the seat during a vehicle collision. Cavities in the seat can be used, in some examples, to create a particular compressibility for optimizing impact.

19 Claims, 5 Drawing Sheets

(56) References Cited

U.S. PATENT DOCUMENTS

| | | | | |
|---|---|---|---|---|
| 8,157,322 B2* | 4/2012 | Daisuke | ............... | B60R 7/043 |
| | | | | 296/68.1 |
| 8,789,400 B2 | 7/2014 | Roszczenko et al. | | |
| 9,004,437 B2 | 4/2015 | Yamada et al. | | |
| 9,415,708 B2* | 8/2016 | Cormier | ............... | B60N 2/70 |
| 9,994,137 B2* | 6/2018 | Faruque | ............... | B33Y 10/00 |
| 10,569,676 B1* | 2/2020 | Wilson | ............... | B60N 2/42745 |
| 2002/0190550 A1* | 12/2002 | Huang | ............... | B60N 2/646 |
| | | | | 297/248 |
| 2004/0160094 A1* | 8/2004 | Flogard | ............... | B60N 2/4228 |
| | | | | 297/216.12 |
| 2005/0099050 A1* | 5/2005 | Meiller | ............... | B60N 2/885 |
| | | | | 297/396 |
| 2005/0151404 A1* | 7/2005 | Dowty | ............... | B60N 3/063 |
| | | | | 297/284.3 |
| 2005/0264052 A1* | 12/2005 | Dellanno | ............... | B60R 21/04 |
| | | | | 297/216.12 |
| 2006/0170274 A1* | 8/2006 | Moule | ............... | B60N 2/643 |
| | | | | 297/452.32 |
| 2006/0232118 A1* | 10/2006 | Cantrill | ............... | B60N 2/56 |
| | | | | 297/452.35 |
| 2009/0315372 A1* | 12/2009 | Tracht | ............... | B60N 2/42709 |
| | | | | 297/216.12 |
| 2010/0171349 A1* | 7/2010 | Dellanno | ............... | B60N 2/888 |
| | | | | 297/216.12 |
| 2010/0301649 A1* | 12/2010 | Mathews | ............... | B60N 2/986 |
| | | | | 297/452.48 |
| 2011/0126698 A1* | 6/2011 | Ripley | ............... | F41H 7/046 |
| | | | | 89/903 |
| 2011/0133533 A1* | 6/2011 | Herzberg | ............... | B60N 2/2809 |
| | | | | 297/239 |
| 2011/0204604 A1* | 8/2011 | Hoshi | ............... | B60N 2/42709 |
| | | | | 280/730.2 |
| 2011/0210579 A1* | 9/2011 | Marur | ............... | B60N 2/42709 |
| | | | | 296/187.03 |
| 2011/0227376 A1* | 9/2011 | Franck | ............... | B60N 2/2821 |
| | | | | 297/216.11 |
| 2012/0049595 A1* | 3/2012 | Inou | ............... | B60N 2/643 |
| | | | | 297/452.29 |
| 2012/0119551 A1* | 5/2012 | Brncick | ............... | B60N 2/646 |
| | | | | 297/284.2 |
| 2012/0313409 A1* | 12/2012 | Michalak | ............... | B60N 2/56 |
| | | | | 297/452.41 |
| 2013/0113262 A1* | 5/2013 | Nam | ............... | A47G 9/1081 |
| | | | | 297/391 |
| 2013/0257119 A1* | 10/2013 | Roberts | ............... | B60N 2/427 |
| | | | | 297/216.13 |
| 2013/0313885 A1* | 11/2013 | Nishiyama | ............... | B60N 2/90 |
| | | | | 297/452.21 |
| 2014/0217788 A1* | 8/2014 | Norwood | ............... | B60N 2/888 |
| | | | | 297/216.12 |
| 2015/0048666 A1* | 2/2015 | Gardner | ............... | B60N 2/01 |
| | | | | 297/452.21 |
| 2015/0091344 A1* | 4/2015 | Tanner | ............... | B60N 2/2872 |
| | | | | 297/216.11 |
| 2015/0202999 A1* | 7/2015 | Jafri | ............... | B64D 11/0015 |
| | | | | 297/216.12 |
| 2015/0367762 A1* | 12/2015 | Yasuda | ............... | B60N 2/68 |
| | | | | 297/216.14 |
| 2015/0367943 A1* | 12/2015 | Saada | ............... | B64D 11/06 |
| | | | | 297/216.13 |
| 2016/0153511 A1* | 6/2016 | Dickinson | ............... | B60N 2/42709 |
| | | | | 188/266 |
| 2016/0200226 A1* | 7/2016 | Dellanno | ............... | B60N 2/888 |
| | | | | 297/216.12 |
| 2017/0217341 A1* | 8/2017 | Kaneda | ............... | B60N 2/643 |
| 2017/0232877 A1* | 8/2017 | De Nichilo | ............... | B60N 2/68 |
| | | | | 297/452.18 |
| 2017/0361745 A1* | 12/2017 | Ishii | ............... | B60N 2/5891 |
| 2018/0178686 A1* | 6/2018 | Veine | ............... | B60N 2/68 |
| 2018/0304785 A1* | 10/2018 | Tobata | ............... | A47C 7/029 |
| 2019/0106037 A1* | 4/2019 | Mankame | ............... | B60N 2/70 |
| 2019/0176668 A1* | 6/2019 | Araki | ............... | B60N 2/70 |
| 2019/0184861 A1* | 6/2019 | Virdis | ............... | B60N 2/4235 |
| 2020/0070691 A1* | 3/2020 | Glain | ............... | B60N 2/885 |

OTHER PUBLICATIONS

International Preliminary Report on Patentability for PCT Application No. PCT/US20/37711, dated Dec. 30, 2021, 7 pages.

* cited by examiner

SEAT CRUSH STRUCTURE

BACKGROUND

A seat for an occupant of a vehicle is generally designed for safety, to reduce risk of injury to the occupant in the event of an abrupt movement or a collision involving the vehicle. For example, the vehicle may experience a collision from the rear or a frontal (e.g., head-on) collision. During a frontal collision, seatbelts may be the primary safety feature. During a collision from the rear, however, safety may rely more on the seat's ability to support the occupant while absorbing energy of inertial forces imparted on the occupant during the collision. Structural requirements of such a seat typically vary for different occupants because of size, so that a one-size-fits-all approach to providing safety presents design challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

This disclosure relates to designs and construction of a seat for a vehicle. The seat is designed for safety, among other things, to reduce risk of injury to an occupant of the seat in the event of an abrupt movement or a collision involving the vehicle from the rear. During such a collision, for example, safety generally relies on the seat's ability to support the occupant while absorbing energy of inertial forces imparted on the occupant during the collision. A number of aspects of design and materials of a seat determine its safeness. For example, a seat may have a seatback geometry designed to minimize a gap between an occupant and the seatback, thereby allowing the seat to minimize impact forces to the occupant in a rear-facing collision by absorbing energy of the occupant over a longer distance. For example, particular portions of a seat surface may be recessed (e.g., concave) so that the occupant's body generally follows contours of the seat surface, as described below. In some examples, a seat may include one or more materials that plastically deform under a compressive force, such as a force imparted on the seat by an occupant accelerating toward (relatively speaking) the seat due to a vehicle collision.

In examples described herein, a seat may generally include a seatback, one or two side assemblies, and a seat bottom assembly. However, in other examples, seats may be constructed of a greater or lesser number of assemblies. For instance, in some examples, seats may be constructed of a single assembly or tub that includes a seat bottom, a seatback, a first side, and/or a second side. The seat may be configured to hold one or more occupants sitting side by side.

Figure 1:
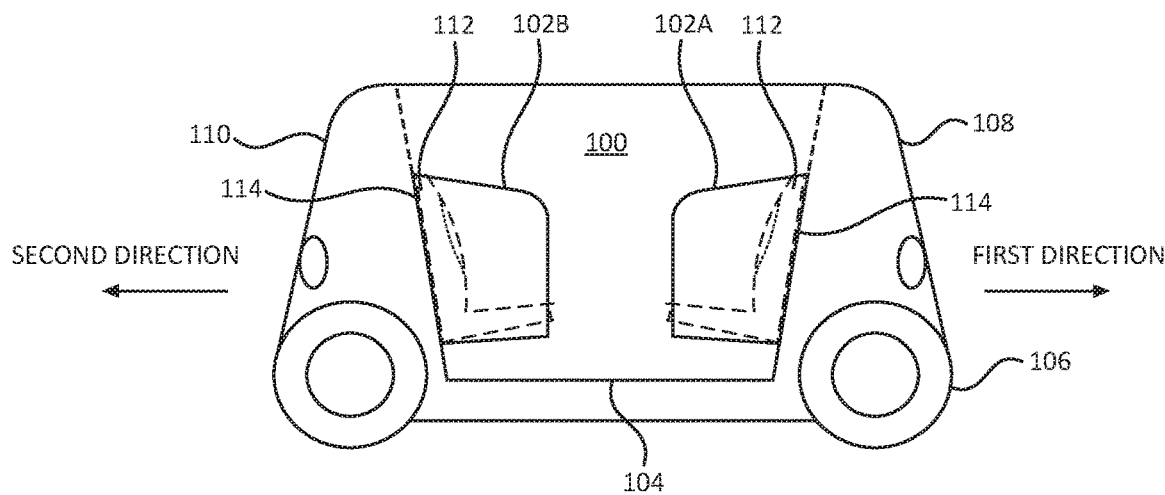
FIG. 1 is a schematic side view of an example vehicle having seats.
Figure 2:
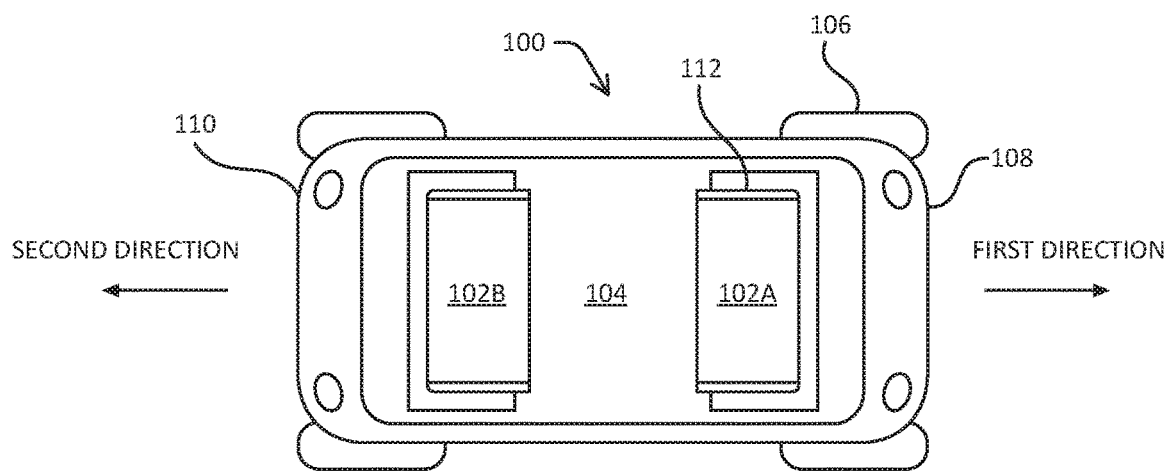
FIG. 2 is a schematic top view of the example vehicle having the seats.

FIG. 1 is a schematic side view of an example vehicle 100 having seats 102. FIG. 2 is a schematic top view of vehicle 100. While this example includes two seats 102 oriented facing one another (e.g., a "carriage seating" configuration), in other examples any number of one or more seats may be disposed in a vehicle at locations and/or orientations other than what is indicated in FIGS. 1 and 2. For instance, though illustrated as bench style seats which can accommodate multiple passengers herein, in some examples, multiple individual and/or bench style seats may be disposed in rows facing a same direction or differing directions, or a single seat may be disposed in a vehicle. In the illustrated example, seats 102 may include a first seat 102A in one part of the vehicle and a second seat 102B in another part of the vehicle. An occupant(s) in first seat 102A may be positioned by the first seat to face an occupant(s) in second seat 102B, and these occupants may share a common floor area 104.

In some examples, vehicle 100 may be an autonomous vehicle configured to operate according to a Level 5 classification issued in 2016 by the U.S. National Highway Traffic Safety Administration, for example, which describes a vehicle capable of performing all safety-critical functions for an entire trip, with the driver (or occupant) not being expected to control the vehicle at any time. In that case, since the vehicle may be configured to control all functions from start to stop, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Vehicle 100 is depicted as having four wheels/tires 106. However, other types and configurations of vehicles are contemplated, such as, for example, vans, sport utility vehicles, crossover vehicles, trucks, buses, agricultural vehicles, and construction vehicles. Vehicle 100 may be powered by one or more internal combustion engines, electric motors powered by one or more power supplies (e.g., batteries, hydrogen fuel cells, etc.), or any combination thereof. In addition, although vehicle 100 is illustrated to have four wheels/tires 106, the systems and methods described herein may be incorporated into vehicles having fewer or a greater number of wheels, tires, and/or tracks. Vehicle 100 has four-wheel steering and may operate generally with equal performance characteristics in all directions, for example, such that a first end 108 of vehicle 100 is the leading or front end of the vehicle when traveling in a first direction, and such that the first end 108 becomes the trailing or rear end of the vehicle when traveling in the opposite, second direction, as illustrated in FIGS. 1 and 2. Similarly, a second end 110 of the vehicle is the leading or front end of the vehicle when traveling in the second direction, and the second end 110 becomes the trailing or rear end of the vehicle when traveling in the opposite, first direction. These example characteristics may facilitate greater maneuverability, for example, in small spaces or crowded environments, such as parking lots and urban areas.

In some examples, because of a bi-directionality of vehicle 100, each of first seat 102A and second seat 102B may, at different times, be a leading or a trailing seat, as determined by direction of travel of the vehicle. Also, each of first seat 102A and second seat 102B may, at different times, be a forward-facing seat or a rear-facing seat, as determined by direction of travel of the vehicle. For example, while first end 108 of vehicle 100 is the leading or front end of the vehicle (e.g., when traveling in the first direction), the occupant(s) in first seat 102A is facing backward (e.g., away from the direction of travel) and the occupant(s) in second seat 102B is facing forward (e.g., toward the direction of travel). In such a case, a collision against first end 108 of vehicle 100 by an object may impart a rear-end type collision on the occupant(s) in first seat 102A (e.g., occupant(s) accelerating toward, relative to, a seatback 112 of first seat 102A) while imparting a front-end type collision on the occupant(s) in second seat 102B (e.g., occupant(s) accelerating away (relative to the seatback) from seatback 112 of second seat 102B). On the other hand, while second end 110 of vehicle 100 is the leading or front end of the vehicle (e.g., when traveling in the second direction), the occupant(s) in second seat 102B is facing backward (e.g., away from the direction of travel) and the occupant(s) in first seat 102A is facing forward (e.g., toward the direction of travel). In such a case, a collision against second end 110 of vehicle 100 by an object may impart a rear-end type collision on the occupant(s) in second seat 102B while imparting a front-end type collision on the occupant(s) in first seat 102A.

As described below, seats 102 may be attached to a body portion 114 of vehicle 100 (either directly or indirectly, e.g., via an intermediate member or members). Body portion 114 may extend from floor area 104 to above or below a height of seatback 112. In some examples, backs of the seats 102 may be directly adjacent and in contact with the body portion 114 of the vehicle 100. That is, there may be no gap, frame, or support structure disposed between the backs of the seats 102 and the body portion 114 of the vehicle 100. This can distribute forces between the seats 102 and the body portion 114 over a relatively large area (the contact area of the seat with the body portion of the vehicle), thereby minimize flexure of the seats 102 during collision and avoiding point loads caused by intervening frames or support structures.

Figure 3:
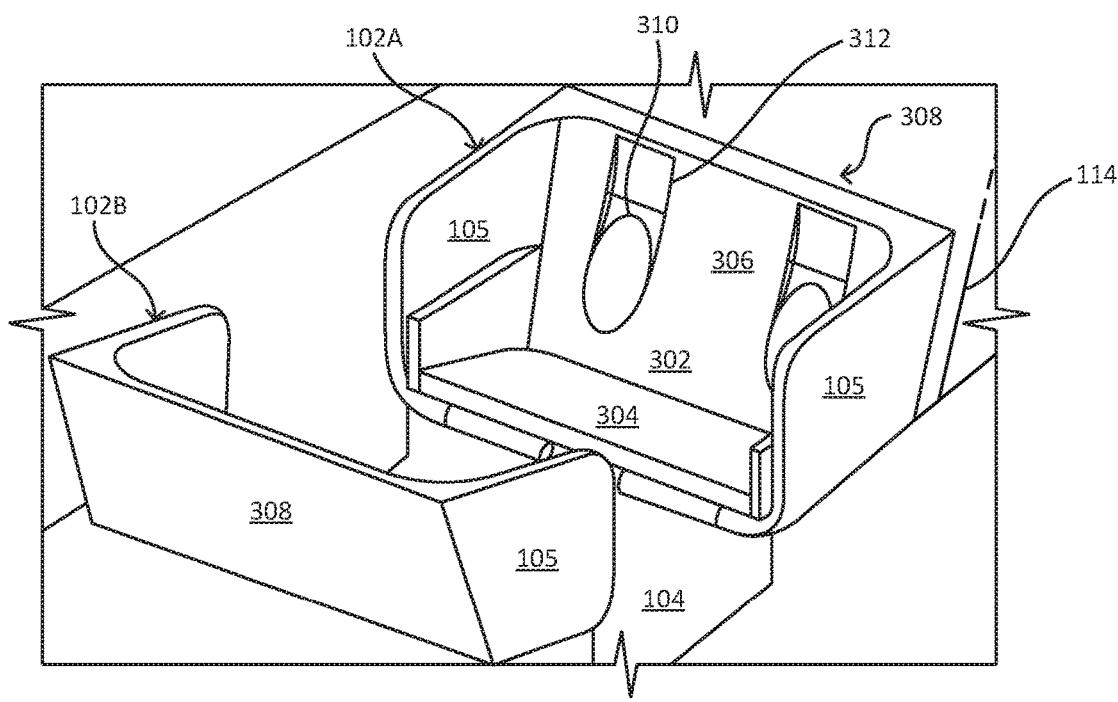
FIG. 3 is a perspective view of example seats of a vehicle.
Figure 4:
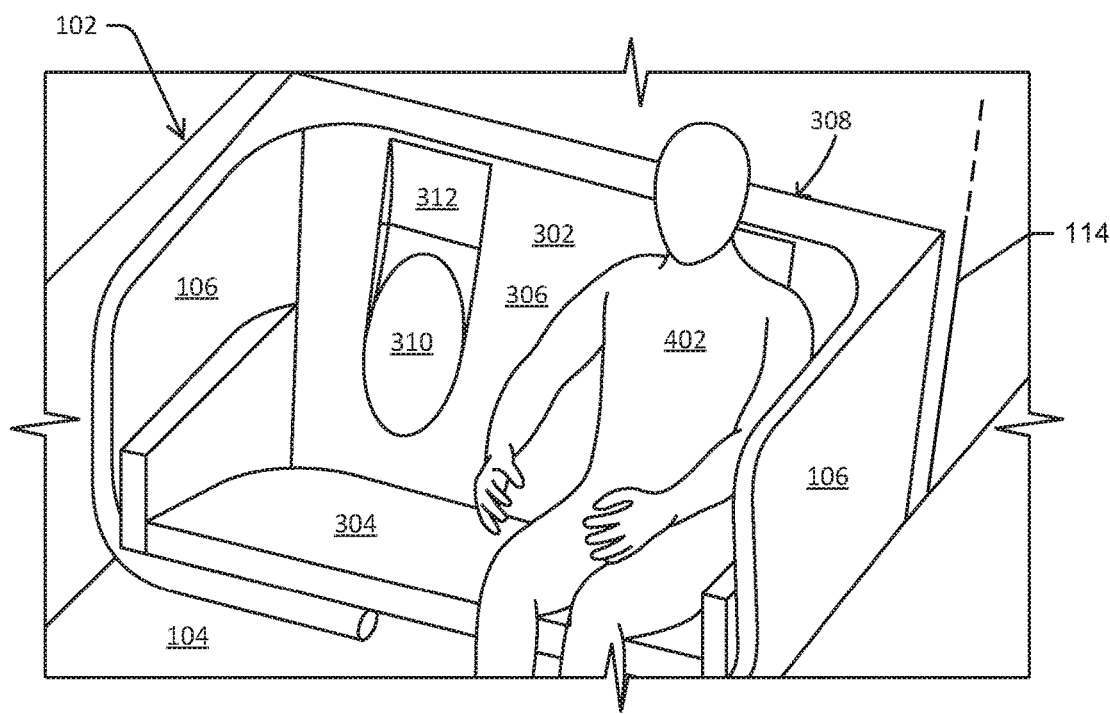
FIG. 4 is a perspective view of an example seat including an occupant.

FIG. 3 is a perspective view of a portion of vehicle 100, having seats 102 that includes seat 102A and seat 102B. FIG. 4 is a perspective view of one of seats 102 including an occupant 402. A common floor area 104 may be shared between the two seats. This perspective view illustrates an angled front view of seat 102A and an angled rear view of seat 102B. Each seat 102 comprises a seatback assembly 302, hereinafter referred to simply as a seatback, a lower assembly 304 (or seat bottom assembly), and one or more side assemblies 105. In particular, seatback 302 has a first side 306 to receive an occupant (e.g., 402 in FIG. 4) and a second side 308 opposite the first side. Of course, though illustrated as multiple assemblies having multiple seating positions, such seats may be individual, integrally formed, or formed by coupling two or more subassemblies.

As discussed above, a number of aspects of design and materials of a seat determine its safeness. For example, the seat may be shaped so that the occupant's body generally falls or conforms into contours of the seat surface. In order to promote such conforming, portions of the seat surface may be recessed (e.g., concave). In particular, first side 306 of seatback 302 includes a recessed portion 310 that is concave and recessed relative to first side 306. Recessed portion 310 may have a substantially ovoid (e.g., substantially ellipsoidal or egg-shaped) surface and have a height (e.g., vertical) that is greater than a width (e.g., horizontal). As described below, when the occupant is seated on lower assembly 304, recessed portion 310 substantially promotes the occupant's body to rest in a position that conforms to a shape of the seatback. Because of this, substantially all of the occupant's back is in contact and/or in relatively close proximity to seatback 302 (minimizing gaps between the occupant's back and the seatback during normal operation). Such contact and/or close proximity allows for a relatively low velocity of the occupant's back relative to seatback 302 during a (rearward) collision. Safeness of seat 102 is improved over that of other vehicle seats because of such a relatively low velocity (e.g., promoting a quicker coupling to the vehicle body in an impact). Also, because the occupant's back is in contact with seatback 302 for a longer period of time during a collision event, seatback 302 is able to absorb energy of the occupant (e.g., decelerate the occupant) over a longer distance, thereby reducing the impact forces experienced by the occupant.

In some examples, first side 306 of seatback 302 also includes a recessed portion 312 that is recessed relative to first side 306. Recessed portion 312, located above recessed portion 310, may have a substantially rectangular perimeter (herein, a square may be considered to be a rectangle having equal sides). Recessed portion 312 promotes the occupant's body to rest in a position that conforms to a shape of the seatback. Thus, when the occupant is seated on lower assembly 304, at least a large portion, if not all, of the occupant's upper back/shoulder area is in contact with the seatback.

In either example above, one or more of the surfaces of recessed portion 310 and/or recessed portion 312 may be defined by multiple arcuate sweeps. In such example, the corresponding surfaces may be defined by a first arc (or curve) swept along a first dimension and a second arc (or curve) swept along a second dimension. As a non-limiting example, such a multiple arcuate sweep may result in the partially egg-shaped (ovoid) surface of at least recessed portion 310. In various examples, defining such surfaces by multiple arcuate sweeps may promote such occupant contact. Additional details of such sweeps are provided herein.

Each seat 102 may be configured to hold two occupants at the same time. Thus, seat 102 may include two "sets" of recessed portion 310 and recessed portion 312.

As described below, in some examples, seatback 302 comprises an energy absorbing material that plastically deforms under a compressive force, which may arise from an acceleration of an occupant's back relative to and against the seatback during a collision. The energy absorbing material may be disposed between the first side 306 and the second side 308 of the seatback 302. The energy absorbing material may be disposed throughout all or a portion of an area between the first side 306 and the second side 308 of the seatback 302. In some examples, the energy absorbing material may be uniformly or non-uniformly disposed between recessed portion 310 and the second side 308 and/or between recessed portion 312 and the second side 308. In some examples, lower assembly 304 may comprise one or more types of energy absorbing materials that is/are different from one or more types of energy absorbing material n seatback 302. Such types of materials may have properties and characteristics that differ from one another. For example, an energy absorbing material in lower assembly 304 may be more stiff and/or be more elastic than an energy absorbing material in seatback 302. In some examples, energy absorbing material may be any of a number of types of polymeric foams (expanded polypropylene (EPP) foam, urethane foam, polystyrene foam, etc.), plastic, aluminum, corrugated cardboard or other material, or a combination thereof. Such materials may be formed in a honeycomb or other structure.

In examples, as mentioned above, seats 102 may be coupled (directly or indirectly) to a body portion 114 of vehicle 100. Body portion 114 may extend from a portion of the body upon which seats are attached to above or below a height of seatback 302. In particular examples, seatback 302, lower assembly 304, and one or more side assemblies 105 each may be coupled to a portion of the vehicle body. Coupling of these parts of seat 102 to the vehicle body may be direct and rigid so that there is substantially no relative motion between seat 102 and the vehicle body during a collision. Such coupling may contribute to the safeness of seat 102 by reducing or avoiding occurrence of point loads and/or flexure during a collision, as described below.

Figure 5:
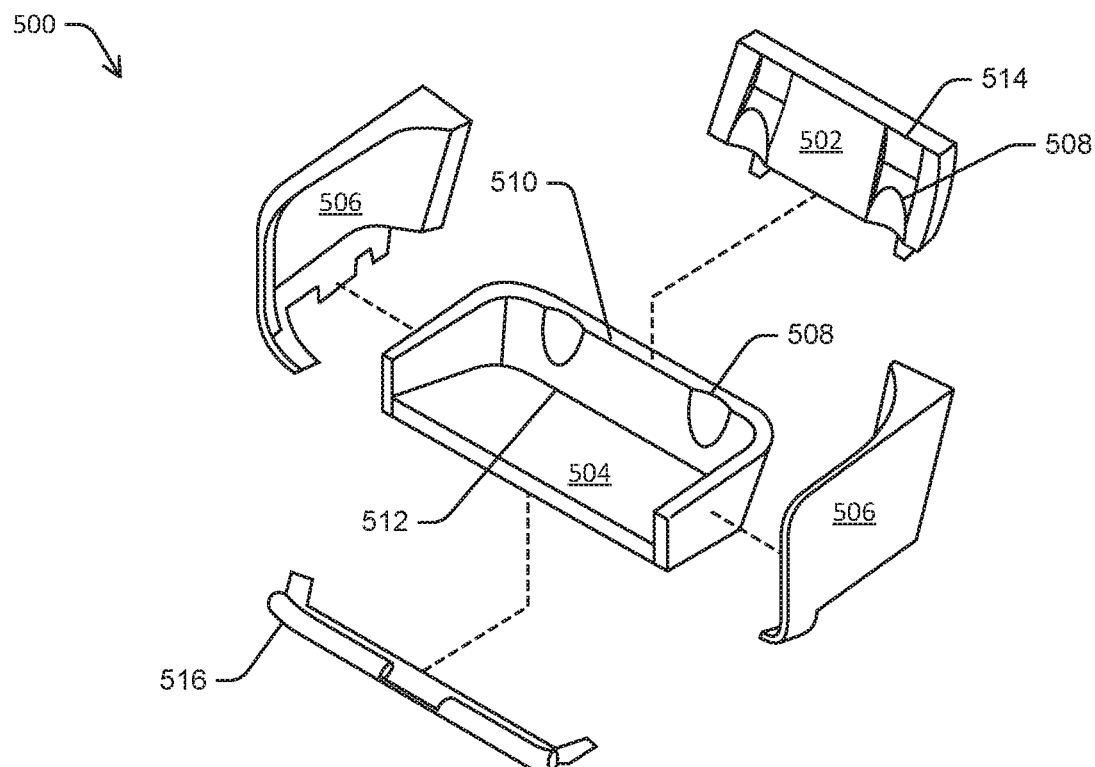
FIG. 5 is an exploded view of an example seat.

FIG. 5 is an exploded view of a seat 500, which may be the same as or similar to seat 102, described above. Seat 500 comprises a seatback 502, a lower assembly 504, and one or more side assemblies 506. Details and location regarding connection between side assemblies 506 and lower assembly 504 may be based at least partly on a desired assembly process for a particular example. In other words, where side assemblies 506 meets lower assembly 504 may be located from what is illustrated in the figure.

In the example illustrated in FIG. 3, for example, seatback 302 includes recessed portion 310. In the example illustrated in FIG. 5, however, seatback 502 includes a part of a recessed portion 508 while lower assembly 504 includes the other part of recessed portion 508. A partition line 510 may divide seatback 502 from lower assembly 504. Location of such a partition line, if it exists (which it may not in some examples), may be based at least partly on a desired assembly process for a particular example. In other words, such a partition line may instead be located at or near a transition 512 between the seat bottom and back so that recessed portion 508 is only included in seatback 502.

Recessed portion 508 may have a substantially oval perimeter and have a height (e.g., vertical) that is greater than a width (e.g., horizontal). Recessed portion 508 substantially conforms to a shape of an occupant's back when the occupant is seated on lower assembly 504. In some examples, seatback 502 also includes a recessed portion 514 that is recessed relative to all portions of seatback 502 except recessed portion 508. Recessed portion 514, located above recessed portion 508, may have a substantially rectangular perimeter. Recessed portion 514 substantially conforms to a shape of an occupant's upper back/shoulder area when the occupant is seated on lower assembly 504.

Seat 500 may also include a front assembly 516 that attaches to lower assembly 504. Additionally, seat 500 may be configured to hold two occupants at the same time. Thus, seat 500 may include two "sets" of recessed portion 508 and recessed portion 514.

Figure 6:
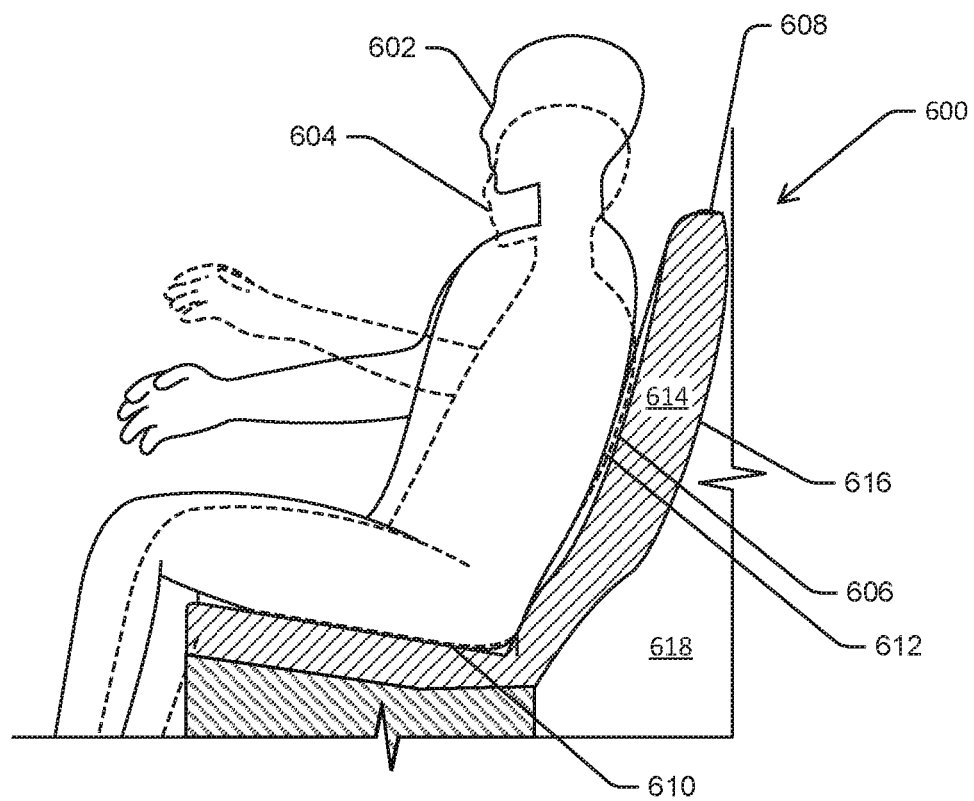
FIG. 6 is a cross-section of a seat including examples of occupants of different sizes.

FIG. 6 is a cross-section of a seat 600 of a vehicle (e.g., 100). Seat 600 may be the same as or similar to seat 102, described above. In some implementations, seat 600 may be configured to have a safeness that is the same or similar for occupants that are within the 5 to 95 percentile range of a population.

In FIG. 6, seat 600 is occupied by a first occupant 602, which represents the size of the 50-percentile portion of a population, and a second occupant 604, which represents the size of the 5-percentile portion of the population. Seat 600 includes a recessed portion 606, disposed in a seatback 608, having a substantially oval perimeter and have a height (e.g., vertical) that is greater than a width (e.g., horizontal). Recessed portion 606 substantially conforms to a shape of an occupant's back when the occupant is seated on a lower assembly 610. In particular, recessed portion 606 substantially conforms to a shape of the back 612 of first occupant 602 and of second occupant 604, thus providing safeness that adequately protects both occupants. In some examples, a vertical distance between a center of recessed portion 606 surface and a bottom 613 of the seatback assembly is between about 375 and 475 mm.

Seat 600 may include one or more materials that relatively easily compress under a compressive force, such as a force imparted on the seat (e.g., or the seatback) by an occupant accelerating toward the seat (e.g., or the seatback accelerating toward the occupant) due to a vehicle collision. For example, seatback 608 may comprise an energy absorbing material 614 that plastically deforms under such a compressive force. The energy absorbing material may be uniformly or non-uniformly disposed between surfaces of recessed portion 606 and a rear side 616 of seatback 608. In some examples, energy absorbing material may be EPP foam, any of a number of plastics, aluminum or other metal, corrugated material such as cardboard, or a combination or composite thereof Generally, energy absorbing material 614 contributes to the safeness of seat 600 by absorbing kinetic energy via compression and inelastic deformation. For example, before a collision (e.g., a collision against a part of the vehicle behind seat 600), occupant 602 (or 604) will have zero velocity with respect to seatback 608. Subsequent to the instant of a collision, however, the occupant will accelerate relative to and toward seatback 608, leading to a rearward force proportional to the acceleration. The rearward force causes the occupant (e.g., substantially the torso of the occupant) to push against seatback 608 with a force that inelastically compresses energy absorbing material 614. If such compression were not inelastic, as for a different material, moments after the collision the different material would recoil (e.g., expand) forward and possibly place injurious forces on the occupant. Thus, energy absorbing material 614 allows for dissipation of forces without such recoil.

Generally, the distribution (e.g., thickness, density, etc.) of energy absorbing material 614 may be a factor in the safeness of seat 600. In various implementations, energy absorbing material 614 is distributed in seatback 608 so that a rearward force causing the occupant to push against seatback 608 inelastically compresses energy absorbing material 614 in a substantially uniform manner. Thus, the occupant will not experience injurious point loads or uneven reactive forces (e.g., forces that arise due to an instigating force). Also, in various implementations, recessed portion 606 has a shape that promotes substantially all of the occupant's back to be in contact and/or in relatively close proximity to energy absorbing material 614. Such contact and/or close proximity minimizes velocity of substantially all parts of the occupant's back relative to seatback 608 during the collision (e.g., providing less to no space for the occupant to accelerate relative to the body) so that kinetic energy of the occupant is relatively small and uniform during compression of the energy absorbing material 614. Moreover, in various examples, seatback 608 is directly attached to a portion 618 of the vehicle (e.g., vehicle body). In this way, depending on the manner in which seatback 608 is attached to portion 618, injurious point loads or uneven reactive forces may be avoided.

Figure 7:
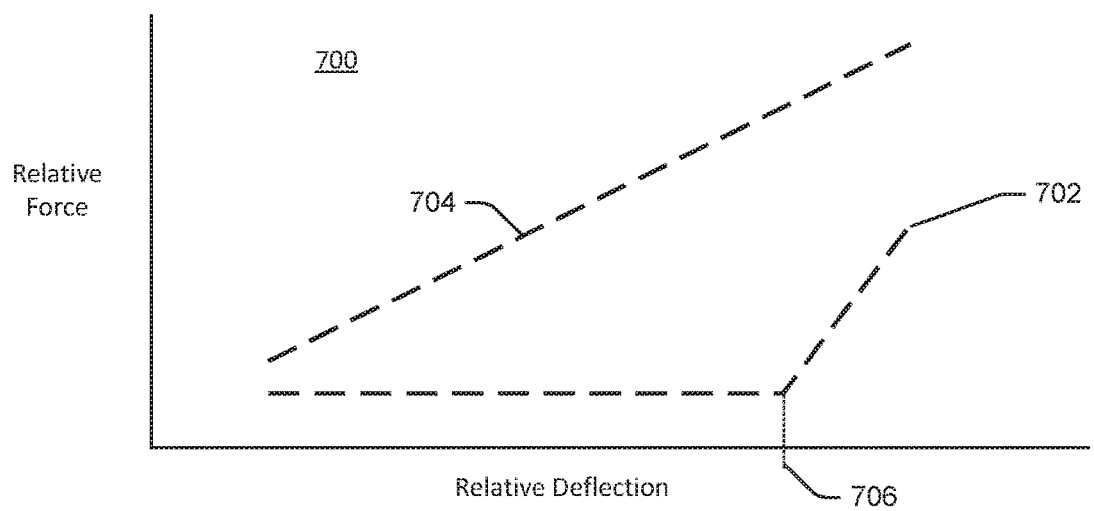
FIG. 7 is a graph of relative force versus relative deflection for two example materials.

FIG. 7 is a graph 700 of relative applied force versus relative deflection (e.g., or compression) for two example materials. The amount of force applied to a material results in a deflection according to plots 702 and 704 of graph 700. Plot 702 represents force versus deflection for an energy absorbing material and plot 704 represents force versus deflection for a material other than an energy absorbing material, such as steel for example. Observing plot 702, deflection of the energy absorbing material increases for a constant force. In other words, the energy absorbing material constantly deflects for a constant value force up to a point 706 where continued deflection results in an increasing applied force. On the other hand, observing plot 704, deflection of the energy absorbing material increases for an increasing force. In other words, the material that is not an energy absorbing material increasingly deflects as the force increases. As used herein, a characteristic of energy absorbing material is that an applied force does not substantially increase as the material continues to deflect (e.g., deform) over at least a portion of a range of applied forces. As explained above, subsequent to the instant of a collision, an occupant of a seat will accelerate relative to and toward a seatback of the seat, leading to a rearward force proportional to the acceleration. The rearward force causes the occupant to push against the seatback with a force that inelastically compresses energy absorbing material, such as that represented by plot 702. If such compression were not inelastic, as for a different material such as that represented by plot 704, moments after the collision the different material would recoil (e.g., expand) forward and possibly place injurious forces on the occupant. Thus, the deflection (or deformation) demonstrated by plot 702 of the energy absorbing material allows for dissipation of forces evenly, applying a non-injurious force to the occupant without such recoil.

Figure 8:
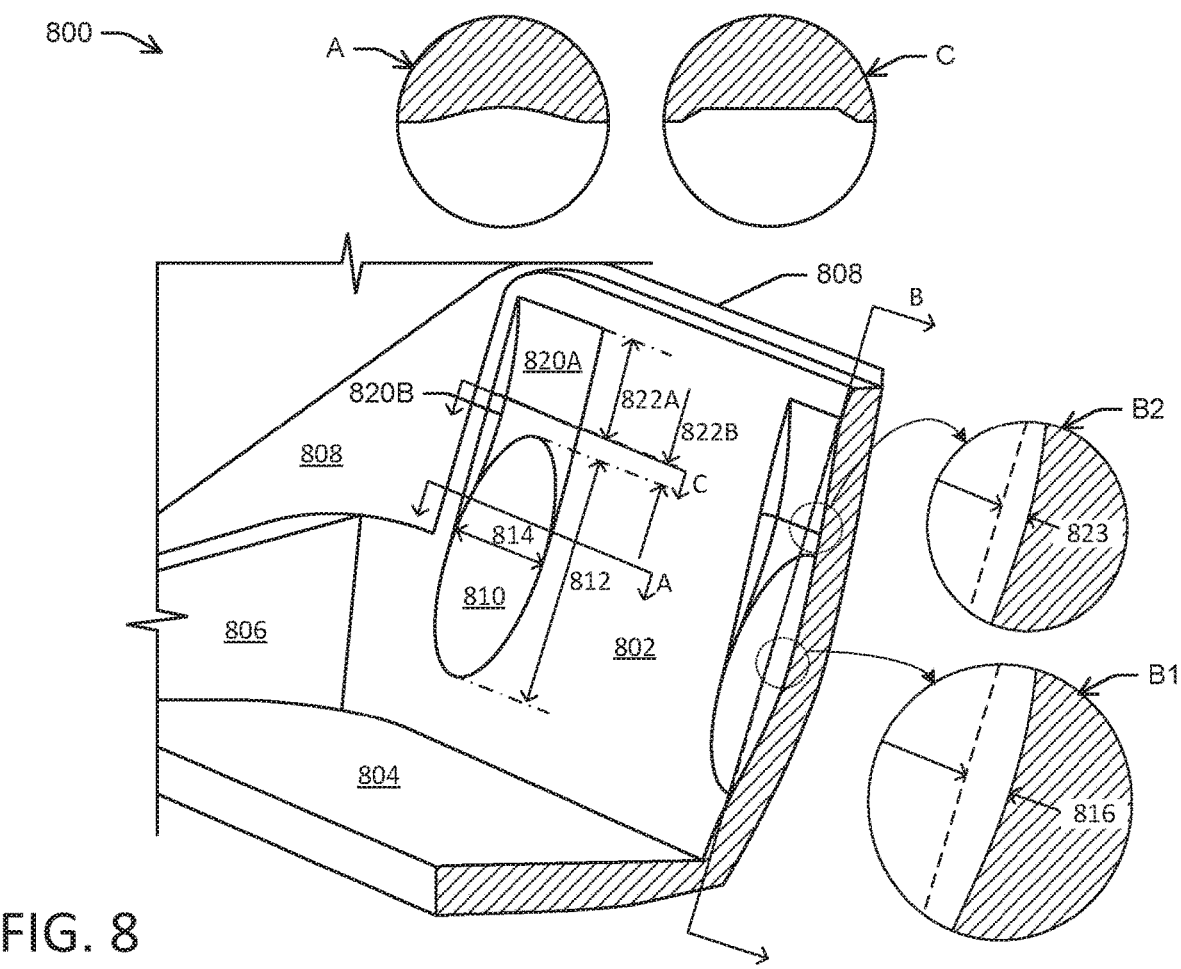
FIG. 8 is a perspective view of an example seat including recessed portions.

FIG. 8 is a perspective view of a portion of an example seat 800 of a vehicle. Seat 800 may be the same as or similar to seat 102 described above. Seat 800 comprises a seatback 802, a lower assembly 804, and one or more side assemblies 806. Seat 800 may be directly attached to a body portion 808 of the vehicle. Seatback 802 includes recessed portion 810, which may be the same as or similar to 310, described above. In some examples, recessed portion 810 may have a substantially oval perimeter and have a height 812 in a range from about 300 to 400 millimeters and a width 814 in a range from about 200 to 250 millimeters, for example. Inset A illustrates a cross-section view along A (e.g., a first direction) that includes an example curvature (e.g., a first curvature). The example curvature illustrated is just one of any number of possible curvatures that could be described by a polynomial or other function that maps to a portion of an ellipsoid, spheroid, or an aspheric surface, just to name a few examples. A maximum depth 816 of recessed portion 810, illustrated in inset B1 of a view of cross-section B (e.g., along a second direction), as measured from the non-recessed surface of seatback 805 may be in a range from about 13 to 23 millimeters. The example curvature illustrated in inset B1 is just one of any number of possible curvatures that could be described by a polynomial or other function that maps to a portion of an ellipsoid, spheroid, or an aspheric surface, just to name a few examples.

In some examples, seatback 802 also includes a recessed portion 820 that is recessed relative to portions of seatback 802 except recessed portion 810. Recessed portion 820, located above recessed portion 810, may have a substantially rectangular perimeter. Inset C illustrates a cross-section view along C (e.g., in the first direction) that includes an example curvature (e.g., a third curvature). The example curvature illustrated is just one of any number of possible curvatures that could be described by a polynomial or other function that maps to a portion of an ellipsoid, spheroid, or an aspheric surface, just to name a few examples. Of course, though inset C is illustrated as having a near linear sweep in one dimension, it should be noted that either one or more of the surfaces associated with the recessed portions shown may, in some examples, be defined by multiple arcuate sweeps. In such examples, having at least one (if not both) surfaces be defined as such, promotion of an occupant to couple to the seat may be achieved. In some examples, a top part 820A of recessed portion 820 may have a height 822A in a range from about 130 to 180 millimeters and a bottom part 820B of recessed portion 820 may have a height 822B in a range from about 20 to 40 millimeters. A maximum depth 823 of recessed portion 820, illustrated in inset B2 of a view of cross-section B, as measured from the non-recessed surface of seatback 805 may be in a range from about 13 to 23 millimeters. The example curvature illustrated in inset B2 is just one of any number of possible curvatures that could be described by a polynomial or other function that maps to a portion of an ellipsoid, spheroid, or an aspheric surface, just to name a few examples. Both of top part 820A and bottom part 820B may have a width that is similar to that of recessed portion 810. However, in other examples, recessed portion 820 may have dimensions that are larger, smaller, or some smaller and some larger than those listed. With respect to any one or more of the dimensions provided herein (e.g., with respect to depths, heights, widths, points), such points may be used as references for any one or more curves of such multiple arcuate sweeps to define the respective surfaces.

In some implementations, recessed portion 810 and recessed portion 820 may be covered by a fabric (not illustrated) substantially following the contour of seatback 802. In such a case, without a seated occupant, the recessed portions are concealed (which may promote a uniform aesthetic). When an occupant sits down, the fabric is pressed against the recessed portions by the occupant's back.

Figure 9:
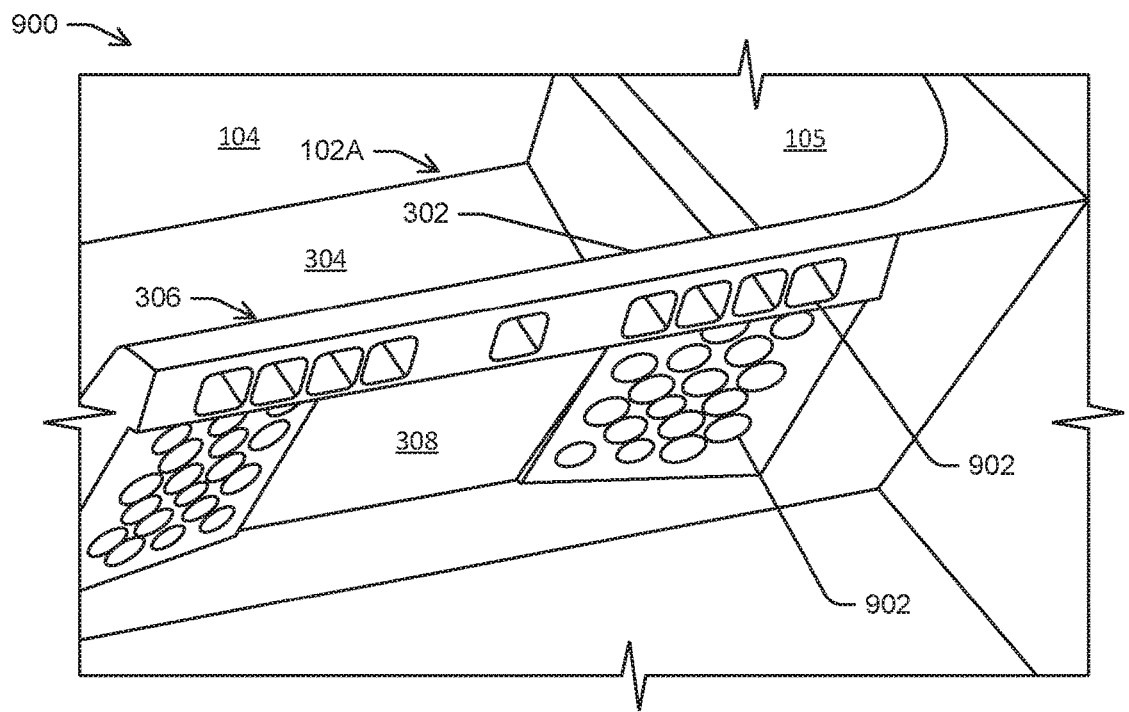
FIG. 9 is a perspective view of an example seat including voids on a rear side of the seat.

FIG. 9 is a perspective view of a portion 900 of seat 102A of vehicle 100, as illustrated in FIGS. 3 and 4. This perspective view illustrates an angled rear view of seat 102A (with a body portion of vehicle 100 omitted for visibility), which comprises seatback 302, lower assembly 304, and one or more side assemblies 105. In particular, seatback 302 has a first side 306 to receive an occupant (e.g., 402 in FIG. 4) and a second side 308 opposite the first side. A common floor area 104 may be shared between seats 102A and 102B, as described above. In some implementations, second side 308 of seatback 302 may include one or more cavities 902 (e.g., formed in seatback 302 between first side 306 and second side 308). Such cavities may allow for energy absorbing material of seatback 302 to compress (e.g., crush) in a particular, substantially uniform manner, so as to absorb energy of compressive forces during a collision. As described above, the distribution (e.g., thickness, density, etc.) of energy absorbing material (e.g., 614) may be a factor in the safeness of seat 102A. In various implementations, the energy absorbing material is distributed, and may include cavities 902, to provide a particular stiffness in seatback 302. Thus, a rearward force causing the occupant to push against seatback 302 inelastically may compress the energy absorbing material in a particular way (e.g., such as in a substantially uniform manner). Thus, the occupant will not experience injurious point loads or uneven reactive forces (e.g., forces that arise due to an instigating force).

A particular combination of energy absorbing material and strategically placed cavities 902 may allow for a desired amount of compressibility of seatback 302. Cavities 902 may have any depth, size, shape (such as cylindrical, conical, rectangular, and so on), number, and/or spacing. Cavities 902, which may comprise one or more individual cavities, may be located on second side 308 of seatback 302 in any of a number of particular or random patterns. Individual ones of the cavities 902 may be the same size and/or shape or may be different sizes and/or shapes than one another. Cavities 902 may be concealed by material (not illustrated in FIG. 9) that covers at least a portion of second side 308. In some examples, the cavities 902 may extend completely or partially through a thickness of the seatback 302 (e.g., they may be through holes, they may be blind holes open on one side/surface of the seatback, and/or they may be voids enclosed on all sides by the seatback).

Figure 10:
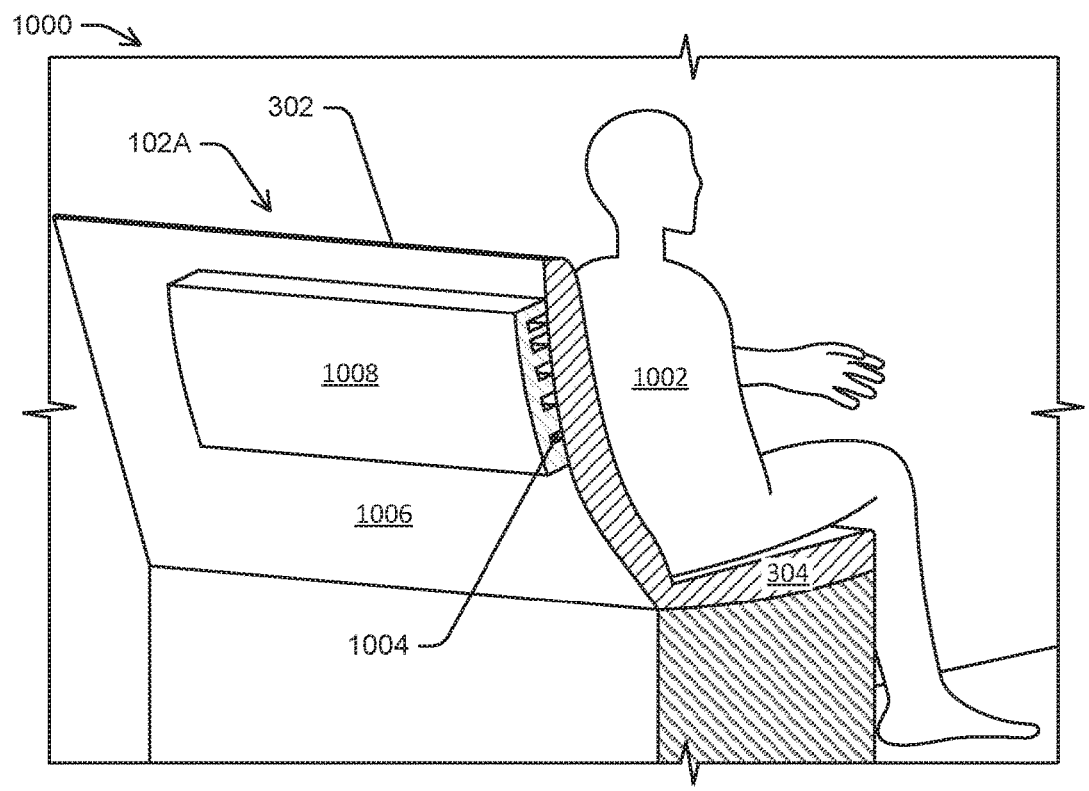
FIG. 10 is a perspective view of an example seat including channels on the rear side of the seat.

FIG. 10 is a perspective view of a portion 1000 of seat 102A of vehicle 100, as illustrated in FIGS. 3 and 4. This perspective view illustrates an angled rear view of seat 102A (with a body portion of vehicle 100 omitted for visibility), which comprises seatback 302 and lower assembly 304. An occupant 1002 is seated in seat 102A. In some implementations, channels 1004 may be located on at least a portion of a backside 1006 of seatback 302. Cavities 902, illustrated in FIG. 9, may be concealed by material that forms backside 1006. Channels 1004 may extend across the whole seatback or a portion thereof and may be used to contain runs of wires, cables, vents, or other structures, for example. In some implementations, channels 1004 may be separated from the body of the vehicle (behind seat 102A) by material 1008, as illustrated in FIG. 10. Alternatively, or additionally, channels 1004 may be exposed to the portion of the body of the vehicle that is directly behind seat 102A. In other words, there need not be material 1008 between channels 1004 and the portion of the body.

EXAMPLE CLAUSES

A. A vehicle comprising a seat that includes a seatback assembly having a first side to receive an occupant and a second side opposite the first side, the seatback assembly comprising: a first seatback surface on the first side; a second seatback surface on the first side, the second seatback surface being concave and recessed relative to the first seatback surface, the second seatback surface having a first curvature with respect to a first direction and a second curvature with respect to a second direction, the second direction perpendicular to the first direction; a third seatback surface on the first side, the third seatback surface being recessed relative to the first seatback surface, the third seatback surface being disposed above the second seatback surface and having a third curvature with respect to the first direction; and an energy absorbing material that plastically deforms under a compressive force, the energy absorbing material disposed between the second side and the second seatback surface and between the second side and the third seatback surface.

B. The vehicle of paragraph A, wherein a depth of the second seatback surface relative to the first seatback surface is between about 13 and 23 mm, and a vertical distance between a center of the second seatback surface and a bottom of the seatback assembly is between about 375 and 475 mm.

C. The vehicle of paragraph A, wherein the energy absorbing material comprises at least one of expanded polypropylene (EPP) foam, plastic, aluminum, or corrugated cardboard.

D. The vehicle of paragraph A, the seatback assembly further comprising one or more cavities formed in the seatback assembly between the first side and the second side, and wherein compressibility of the seatback assembly is based, at least in part, on the one or more cavities.

E. The vehicle of paragraph A, the vehicle comprising a body, wherein the second side of the seatback assembly is directly attached to the vehicle body.

F. The vehicle of paragraph A, wherein the second seatback surface has a substantially oval perimeter and has a height that is greater than a width, and the third seatback surface has a substantially rectangular perimeter.

G. The vehicle of paragraph F, wherein the height of the second seatback surface is between about 300 and 400 millimeters (mm) and the width of the second seatback surface is between about 200 and 250 mm.

H. A seat for a vehicle, the seat comprising: a seatback having a first side to receive an occupant and a second side opposite the first side, the seatback assembly comprising: a first seatback surface on the first side; a second seatback surface on the first side, the second seatback surface being concave and recessed relative to the first seatback surface, the second seatback surface having a first curvature with respect to a first direction and a second curvature with respect to a second direction, the second direction perpendicular to the first direction; and a third seatback surface on the first side, the third seatback surface being recessed relative to the first seatback surface, the third seatback surface being disposed above the second seatback surface and having a third curvature with respect to the first direction.

I. The seat of paragraph H, further comprising an energy absorbing material that plastically deforms under a compressive force, the energy absorbing material disposed between the second side and the concave recessed portion and between the second side and the rectangular portion.

J. The seat of paragraph H, wherein a depth of the second seatback surface relative to the first seatback surface is between about 13 and 23 mm, and a vertical distance between a center of the second seatback surface and a bottom of the seatback is between about 375 and 475 mm.

K. The seat of paragraph H, wherein the height of the second seatback surface is between about 300 and 400 millimeters (mm), the width of the second seatback surface is between about 200 and 250 mm.

L. The seat of paragraph 8, wherein the energy absorbing material comprises at least one of expanded polypropylene (EPP) foam, plastic, aluminum, or corrugated cardboard.

M. The seat of paragraph H, the seatback further comprising one or more cavities formed in the seatback between the first side and the second side, and wherein compressibility of the seatback is based, at least in part, on the one or more cavities.

N. The seat of paragraph H, wherein the second seatback surface has a substantially oval perimeter and has a height that is greater than a width, and the third seatback surface has a substantially rectangular perimeter.

O. A seat comprising: a seatback having a first side to receive an occupant and a second side opposite the first side, the seatback comprising: a first seatback surface on the first side; a second seatback surface on the first side, the second seatback surface being concave and recessed relative to the first seatback surface, the second seatback surface having a first curvature with respect to a first direction and a second curvature with respect to a second direction, the second direction perpendicular to the first direction; and an energy absorbing material that plastically deforms under a compressive force, the energy absorbing material disposed between the second side and the second seatback surface.

P. The seat of paragraph O, the seat further comprising a third seatback surface on the first side, the third seatback surface being recessed relative to the first seatback surface, the third seatback surface being disposed above the second seatback surface and having a third curvature with respect to the first direction, wherein the energy absorbing material is further disposed between the second side and the third seatback surface.

Q. The seat of paragraph O, wherein a depth of the second seatback surface is between about 13 and 23 mm, and a vertical distance between a center of the second seatback surface and a bottom of the seatback is between about 375 and 475 mm.

R. The seat of paragraph O, wherein the energy absorbing material comprises at least one of expanded polypropylene (EPP) foam, plastic, aluminum, or corrugated cardboard.

S. The seat of paragraph O, the seatback further comprising one or more cavities formed in the seatback between the first side and the second side, and wherein compressibility of the seatback is based, at least in part, on the one or more cavities.

T. The seat of paragraph O, wherein the second seatback surface has a substantially oval perimeter and has a height that is greater than a width, and the third seatback surface has a substantially rectangular perimeter.

While the example clauses described above are described with respect to one particular implementation, it should be understood that, in the context of this document, the content of the example clauses can also be implemented via a method, device, system, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
a body; and
a seat that includes a seatback assembly comprising an energy absorbing material that plastically deforms under a compressive force, the seatback assembly having a first side to receive an occupant and a second side opposite the first side and the energy absorbing material being disposed between the first side and the second side, the second side of the seatback assembly being directly attached to the body of the vehicle, the seatback assembly comprising:
a first seatback surface on the first side;
a second seatback surface comprising a contour formed in the energy absorbing material on the first side of the seatback assembly, the contour being defined by the energy absorbing material having a thickness between the first side and the second side that is non-uniform over at least a portion of the seatback including the contour, the second seatback surface being concave and recessed relative to the first seatback surface, the second seatback surface having a first curvature with respect to a first direction and a second curvature with respect to a second direction, the second direction perpendicular to the first direction; and
a third seatback surface comprising a contour formed in the energy absorbing material on the first side, the third seatback surface being recessed relative to the first seatback surface, the third seatback surface being disposed above the second seatback surface and having a third curvature with respect to the first direction.

2. The vehicle of claim 1, wherein a depth of the second seatback surface relative to the first seatback surface is between about 13 and 23 millimeters (mm), and a vertical distance between a center of the second seatback surface and a bottom of the seatback assembly is between about 375 and 475 mm.

3. The vehicle of claim 1, the seatback assembly further comprising one or more cavities formed in the seatback assembly between the first side and the second side, and wherein compressibility of the seatback assembly is based, at least in part, on the one or more cavities.

4. The vehicle of claim 1, wherein the second seatback surface has a substantially oval perimeter and has a height that is greater than a width, and the third seatback surface has a substantially rectangular perimeter.

5. The vehicle of claim 4, wherein the height of the second seatback surface is between about 300 and 400 millimeters (mm) and the width of the second seatback surface is between about 200 and 250 mm.

6. The vehicle of claim 1, wherein the second seatback surface overlaps a lateral center of a seating position configured to receive the occupant.

7. The vehicle of claim 1, wherein the second seatback surface is directly adjacent, and in contact with, the body.

8. A seat for a vehicle, the seat comprising:
a seatback comprising an energy absorbing material that plastically deforms under a compressive force, the seatback having a first side including a seating position to receive an occupant and a second side opposite the first side and the energy absorbing material being disposed between the first side and the second side, the seatback comprising:

a first seatback surface on the first side; and a second seatback surface comprising a contour formed in the energy absorbing material on the first side at the seating position, the contour being defined by the energy absorbing material having a thickness between the first side and the second side that is non-uniform over at least a portion of the seatback including the contour, the second seatback surface disposed above the seating position and having a substantially oval perimeter and a height that is greater than a width, the second seatback surface being concave and recessed relative to the first seatback surface, the second seatback surface having a first curvature with respect to a first direction and a second curvature with respect to a second direction, the second direction perpendicular to the first direction.

9. The seat of claim 8, wherein a depth of the second seatback surface relative to the first seatback surface is between about 13 and 23 millimeters (mm), and a vertical distance between a center of the second seatback surface and a bottom of the seatback is between about 375 and 475 mm.

10. The seat of claim 9, wherein the height of the second seatback surface is between about 300 and 400 millimeters (mm), the width of the second seatback surface is between about 200 and 250 mm.

11. The seat of claim 8, the seatback further comprising one or more cavities formed in the seatback between the first side and the second side, and wherein compressibility of the seatback is based, at least in part, on the one or more cavities.

12. The seat of claim 8, further comprising a third seatback surface formed in the energy absorbing material, the third seatback surface being recessed relative to the first seatback surface and having a substantially rectangular perimeter.

13. The seat of claim 8, wherein at least a portion of the energy absorbing material extends from the first side of the seatback to the second side of the seatback.

14. The seat of claim 8, wherein the seat has a two-piece construction comprising an upper assembly coupled to a lower assembly, and wherein the upper assembly includes a first part of the concave and recessed portion of the second seatback surface and the lower assembly includes a second part of the concave and recessed portion of the second seatback surface.

15. A seat comprising:

a seatback comprising an energy absorbing material that plastically deforms under a compressive force, the seatback having a first side including a seating position to receive an occupant and a second side opposite the first side and the energy absorbing material being disposed between the first side and the second side, the seatback comprising:

a first seatback surface on the first side; and a second seatback surface comprising a contour formed in the energy absorbing material on the first side at the seating position, the contour being defined by the energy absorbing material having a thickness between the first side and the second side that is non-uniform over at least a portion of the seatback including the contour, the second seatback surface disposed above the seating position and having a substantially oval perimeter and a height that is greater than a width, the second seatback surface being concave and recessed relative to the first seatback surface, the second seatback surface having a first curvature with respect to a first direction and a second curvature with respect to a second direction, the second direction perpendicular to the first direction.

16. The seat of claim 15, the seat further comprising a third seatback surface on the first side, wherein the third seatback surface is recessed relative to the first seatback surface, the third seatback surface having a third curvature with respect to the first direction, wherein the energy absorbing material is further disposed between the second side and the third seatback surface.

17. The seat of claim 16, wherein the third seatback surface has a substantially rectangular perimeter.

18. The seat of claim 15, wherein a depth of the second seatback surface is between about 13 and 23 millimeters (mm), and a vertical distance between a center of the second seatback surface and a bottom of the seatback is between about 375 and 475 mm.

19. The seat of claim 15, the seatback further comprising one or more cavities formed in the seatback between the first side and the second side, and wherein compressibility of the seatback is based, at least in part, on the one or more cavities.

* * * * *